United States Patent [19]

Younghouse

[11] 4,364,375

[45] Dec. 21, 1982

[54] THERMAL SOLAR ENERGY COLLECTOR

[75] Inventor: Lawrence B. Younghouse, Boonton, N.J.

[73] Assignee: Exxon Research and Engineering Co., Florham Park, N.J.

[21] Appl. No.: 175,335

[22] Filed: Aug. 4, 1980

[51] Int. Cl.³ .............................................. F24J 3/02
[52] U.S. Cl. .................................. 126/444; 126/443; 126/450; 350/407
[58] Field of Search ................ 126/429, 432, 444, 443, 126/901, 450; 52/171; 350/407, 258-265

[56] References Cited

U.S. PATENT DOCUMENTS

| | | | |
|---|---|---|---|
| 1,974,739 | 9/1934 | Fraps | 52/171 |
| 2,992,426 | 7/1961 | Borcherdt | 126/901 |
| 3,474,255 | 10/1969 | White | 350/407 |
| 4,123,141 | 10/1978 | Schuler | 350/407 |
| 4,285,577 | 8/1981 | Schuler | 350/407 |

FOREIGN PATENT DOCUMENTS 743213 10/1943 Fed. Rep. of Germany ...... 350/407

Primary Examiner—James C. Yeung
Attorney, Agent, or Firm—Joseph J. Dvorak

[57] ABSTRACT

This invention contemplates a solar to thermal energy converter comprising spaced apart light polarizing materials defining a conduit therebetween for the passage of a fluid to be heated, the polarizing materials being positioned with respect to each other, whereby the amount of solar energy transmitted through the collector and hence absorbed by the fluid is controlled. Optionally and preferably, at least one of the light polarizing materials is moveable so that the axis of absorption of the polarizing materials can be adjusted with respect to each other and in reference to collector temperature so that a predetermined amount of light will be transmitted through the device, thereby controlling the temperature within the collector.

10 Claims, 7 Drawing Figures

THERMAL SOLAR ENERGY COLLECTOR

BACKGROUND OF THE INVENTION

1. Field of the Invention

This invention relates to solar thermal energy converters.

2. Description of the Prior Art

Numerous devices have been proposed for utilizing solar energy as a source of heat, particularly for home heating needs. Commercialization of such devices, however, has been inhibited because of the typically high initial capital costs of the solar heating systems presently available.

One approach to reducing costs of solar heating systems involves increasing collector efficiency so as to reduce the total number of solar collectors required. High efficiency collectors, however, require special energy absorbing coatings on the absorber plate and/or plastic heat traps, for example, which minimize convection heat losses. One such selective absorber coating, for example, is disclosed in U.S. Pat. No. 3,958,554. A particularly useful device for preventing loss by thermal convection is disclosed in U.S. Pat. No. 4,019,496. These features, on the one hand, increase the thermal efficiency of solar collectors employing them but on the other hand necessitate that such solar thermal collectors be constructed of expensive materials which will sustain not only the high operating temperatures but also the significantly high temperatures that result as the heat load requirements of the collector system decreases. In other words, collectors, and particularly high efficiency collectors, must be designed to withstand temperatures and pressures under no flow or stagnant conditions, and such a design requires expensive materials of construction, and/or means for modulating the temperature within the collector. Another approach to reducing the costs of solar thermal systems is to fabricate solar collectors from relatively inexpensive materials such as plastics. In these instances, protecting the collector against thermal damage is also of vital importance.

One technique proposed for protecting solar collectors from damage that may result from excessively high temperatures existing within the collector for lengthy periods of time requires the venting of the collector using ambient air and thermally actuated valves. U.S. Pat. No. 4,043,317 and U.S. Pat. No. 4,046,134 are exemplary of such type of air venting systems.

Another technique used for protecting solar collectors from thermal damage is disclosed in U.S. Pat. No. 4,102,325. This patented system provides the heat exchange loop for rejecting excess heat to the atmosphere.

Yet another technique for protecting the solar collector from the hazards of excessively high overtemperatures involves shading or otherwise blocking the incident solar radiation from falling on the absorber within the collector at predetermined temperature conditions. U.S. Pat. No. 4,112,918 is illustrative of this technique. Indeed, in this regard, it is worth noting that polarizing windows can be employed to reduce, i.e. to block, the amount of light transmitted through a window and hence incident on the interior of a structure having such a window. An example of such polarizing window is disclosed in U.S. Pat. No. 4,123,141.

Notwithstanding the foregoing technologies, there remains a need for a solar heat collector which is not only simple in construction but lower in cost, thereby overcoming some of the drawbacks of solar to thermal energy converters of the prior art.

SUMMARY OF THE INVENTION

Briefly stated, this invention contemplates a solar to thermal energy converter comprising spaced apart light polarizing materials defining a conduit therebetween for the passage of a fluid to be heated, the polarizing materials being positioned with respect to each other, whereby the amount of solar energy transmitted through the collector and hence absorbed by the fluid is controlled.

Thus, in one embodiment of the present invention, a solar energy absorber is provided comprising spaced apart light polarizing materials between which a fluid is passed for heating by absorbed radiation. The axis of absorption or plane of polarization of each of the light polarizing materials are positioned so that a minimum amount of light is transmitted through the structure, thereby assuring for the maximum amount of absorption of radiant energy by the fluid to be heated thereby.

In yet another embodiment of the present invention a solar collector is provided having at least two sheets of light polarizing material spaced apart from each other. One of the light polarizing materials, however, is moveable so that the axis of absorption of the polarizing materials can be adjusted with respect to each other and in reference to collector temperature so that a predetermined amount of light will be transmitted through the device, thereby controlling the temperature within the collector.

DETAILED DESCRIPTION OF THE INVENTION

Figure 1:
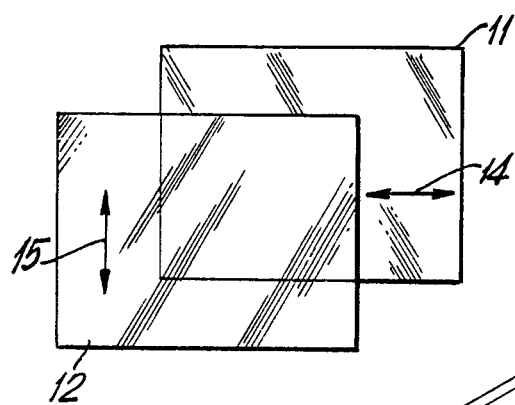
FIG. 1 is a schematic diagram illustrating a key feature of the present invention.

Referring now to the drawings and the key feature of the solar collector of the present invention, there is provided a solar energy absorber comprising spaced apart light polarizing materials which define a conduit therebetween for the passage of a fluid to be heated by solar radiation.

In FIGS. 1 to 4, the spaced apart light polarizing materials are shown as sheet materials 11 and 12. The axes of absorption of the polarized sheet materials are designated in FIGS. 1 and 2 as arrows 14 and 15, respectively.

It is an important feature of the present invention that the axis of absorption of the light polarizing material in the collector of the present invention be oriented at a predetermined orientation with respect to each other so that a maximum and a minimum light transmission through the structure can be effected. Thus, in the embodiments shown in FIGS. 1 and 2, the axes of absorption 14 and 15 of the light polarizing material 11 and 12 are substantially stantially at right angles to each other, thereby minimizing the amount of light that will be transmitted through the panels, thereby maximizing the amount of energy that will be absorbed by the fluid in the space between the light polarizing materials.

Figure 2:
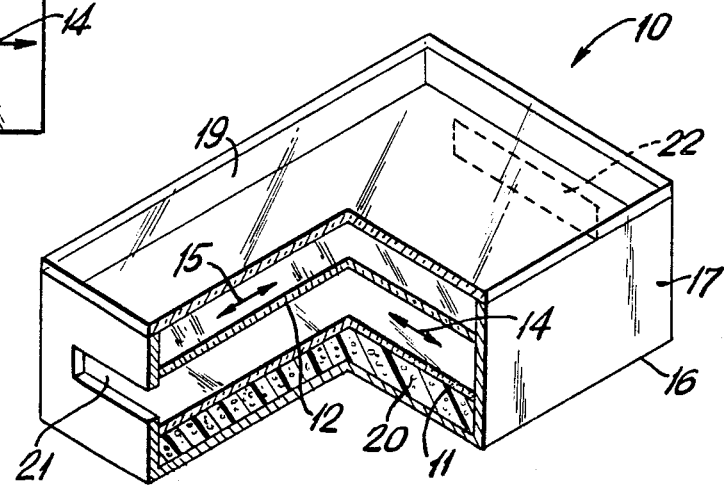
FIG. 2 is a perspective view of a flat plate solar to thermal energy converter unit having two spaced apart light polarizing materials in accordance with the practice of the present invention.

In the embodiment shown in FIG. 2, a flat plate solar to thermal energy converter includes a generally rectangular frame 16 having upwardly extending side walls 17 and end walls 18. Any material can be used in fabricating the rectangular frame; however, it is particularly preferred in the practice of the present invention that the rectangular frame be formed from a lightweight sheet material, such as sheet metal. However, other materials having the requisite structural strength can also be employed.

The solar to thermal energy converter 10 includes a cover plate 19 which serves to reduce heat loss as well as provide protection for the light polarizing materials within the collector. The cover plate is made of any material which is generally transparent to solar radiation. Typically cover plate 19 is made of glass or clear plastic. As is shown in FIG. 2, at least the bottom surface of the collector 10 is provided with an insulating material such as polyurethane foam insulation 20. Optionally the side walls may also be insulated with appropriate insulating material.

Within the solar to thermal energy converter 10 are included two spaced apart light polarizing materials defining a conduit therebetween for the passage of fluid. The light polarizing materials are commercially available, and they can be fabricated from glass and plastics, for example, by well-known techniques. Consequently, the fabrication of the light polarizing materials does not constitute a part of the present invention. It is important, however, that these light polarizing materials 11 and 12 have their axes of absorption 14 and 15 arranged at a predetermined position with respect to each other so as to affect the amount of solar radiation that is transmitted through them. Thus, in the embodiment shown in FIG. 2, the light polarizing materials have their axes of absorption arranged so as to be substantially perpendicular with respect to each other, thereby minimizing the amount of light that is transmitted through these light polarizing materials and consequently maximizing the amount of energy that will be absorbed by a fluid passing in the space between the light polarizing materials 11 and 12. A fluid inlet 21 is provided in one end 18 of flat plate collector 10 so as to communicate with the space defined by the light polarizing materials 11 and 12. At the opposite end of the solar to thermal converter 10 is an outlet 22 communicating with the conduit defined by the spaced apart light polarizing materials 11 and 12.

Manifold means (not shown) mounted in communication with inlet 21 and outlet 22 can be provided to connect a plurality of solar to thermal converters 10 in parallel relationship. Alternatively, a manifold or other suitable device (not shown) can be provided to communicate with inlet 21 and outlet 24 to permit the serial connection of a plurality of solar to thermal converters 10.

Optionally and preferably, fan or pump means (not shown) are provided for circulating the heat transfer fluid through the inlet of the converter 10 and outwardly to a source or point of use for such heated fluid.

Figure 3:
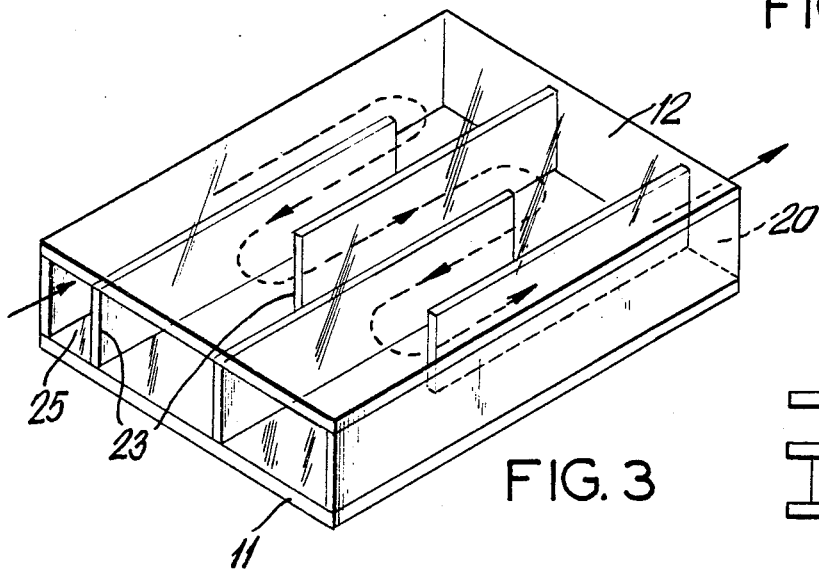
FIG. 3 is a perspective schematic view of two spaced apart sheets of polarizing material having spaces defining flow channels therebetween.

Referring now to FIG. 3, there is shown two spaced apart light polarizing materials 11 and 12 which are separated by a plurality of separating ribs 23 which serve to define a serpentine path in the conduit between the light polarizing materials 11 and 12 through which the fluid must flow en route from the inlet to the outlet of the collector. As will be readily appreciated, the inlet 23 and outlet 24 of frame 16 will, of course, be sized and positioned to correspond with inlet 25 and outlet 26 of the conduit defined by the spaced apart light polarizing materials 11 and 12.

Figure 4:
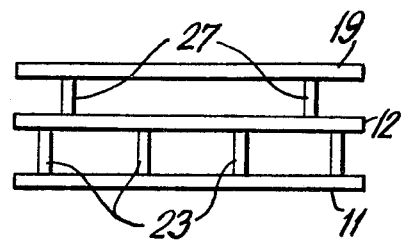
FIG. 4 is a partial sectional view of an alternate embodiment of the solar to thermal energy converting element having a top light transparent sheet material and two polarizing sheet materials spaced apart from each other.

Referring to FIG. 4, an alternate embodiment of the present invention is shown in which the light polarizing materials 11 and 12 are spaced apart by spacers 23, thereby defining a tortuous path for the flow of fluid in the conduit between the spaced apart light polarizing materials 11 and 12. In the construction of FIG. 4, as illustrated, the top protective layer 19 is also connected to the polarizing material and spaced therefrom by connecting ribs 27. This unitary construction shown in FIG. 4 offers significant handling and manufacturing advantages.

Figure 5:
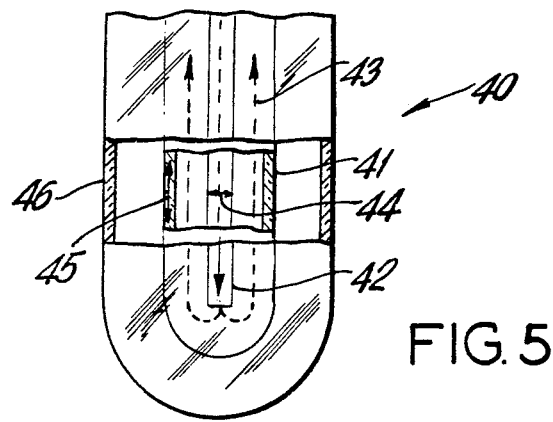
FIG. 5 is a partial sectional view of a vacuum jacketed tubular solar collector employing the principles of the present invention.

In the construction illustrated in FIG. 5, the light polarizing materials 41 and 42 of the vacuum jacketed tubular collector 40 define a space therebetween which serves as a conduit for the flow of material to be heated shown generally by the dotted lines 43. As can be seen in FIG. 5, the axes of absorption 44 and 45, respectively, of the light polarizing materials 41 and 42 are arranged to be substantially perpendicular with respect to each other, thereby minimizing the amount of light that will be transmitted by the light polarizing material and thereby maximizing the amount of energy that will be absorbed by the fluid flowing through the conduit defined by the spaced apart light polarizing materials 41 and 42. As is shown in FIG. 5, such typical tubular solar to thermal energy converters also include an external glass tubular vacuum jacketed cover 46.

Figure 6:
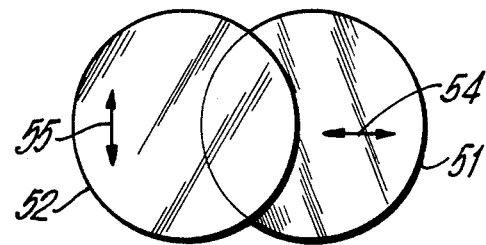
FIG. 6 is a schematic illustration of alternate embodiment of the present invention.

In the foregoing devices, the spaced apart light polarizing materials are arranged at a predetermined fixed angle of orientation with respect to each other; however, as indicated herein the present invention also contemplates moveable light polarizing materials whereby the axis of absorption of the polarizing materials can be adjusted with respect to each other so as to affect the amount of radiant energy that is adsorbed. In this manner the temperature within the collector can be modulated or controlled. For example, in FIG. 6 the spaced apart light polarizing materials are shown as circular sheet materials 51 and 52. The axes of absorption of the polarized sheet materials are designated by arrows 54 and 55. Using a temperature sensing means (not shown) and means (not shown) for rotating at least one of the polarizing materials, the plane of polarization of the polarizing materials can be adjusted with respect to each other so that the amount of light that will be transmitted through the device can be varied continuously from a minimum to a maximum and vice versa. Rotation of the light polarizing materials, of course, will be performed in response to the temperature within the collector thereby serving to modulate the temperature in the collector.

Figure 7:
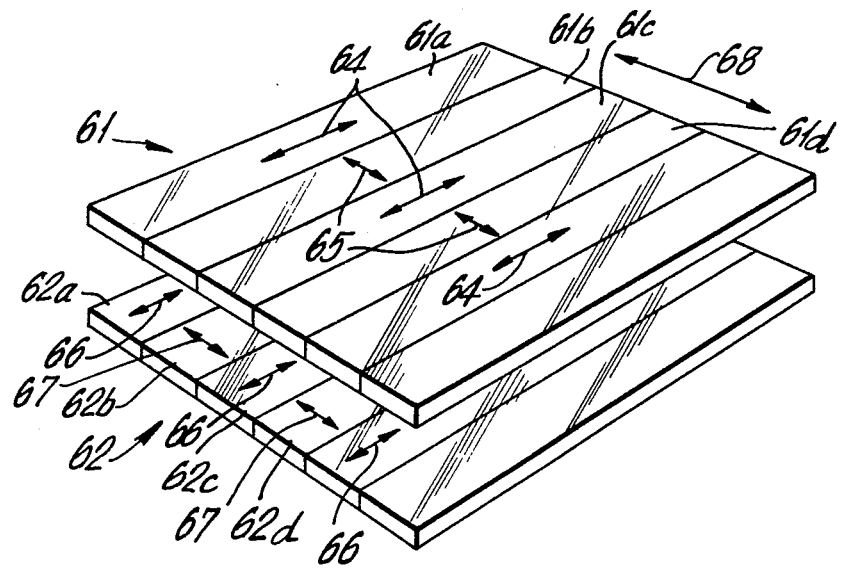
FIG. 7 is a schematic illustration of the utilization of the principles of this invention to alter the amount of solar absorption in a flat plate collector configuration.

In the embodiment shown in FIG. 7, the spaced apart light polarizing materials 61 and 62 each comprise a plurality of strips 61a, 61b, 61c etc. and 62a, 62b, 62c, etc. in which the axis of absorption (designated by arrows 64, 65, 66 and 67) in each adjacent strip is different, and preferably at right angles to the axis of absorption in the preceeding strip. By lateral movement of at least one of the polarizing materials in the direction indicated by arrow 68 results in the positioning of the strips in each of the two spaced apart polarizing materials with respect to each other so that a predetermined amount of light will be transmitted through the solar collector having the polarizing materials thereby affecting the amount of energy that is absorbed by the fluid contained in the collector.

In constructing a solar collector employing this embodiment of the present invention, it is preferred to secure one of the polarizing materials in a fixed position and to mount the second polarizing material spaced apart from the other in a slideably moveable position. A temperature responsive piston, spring or the like is preferrably used to move the second polarizing material relative to the first so that the amount of solar radiant energy that is capable of being absorbed will be at a maximum when a predetermined low temperature exists in the collector and at a minimum when a predetermined high temperature exists in the collector.

Although the present invention has been described with a certain degree of particularity, it is understood that the present disclosure has been made by way of example, and that changes in details of structure may be made without departing from the spirit thereof.

What is claimed is:

1. A solar energy to thermal energy converter comprising spaced apart light polarizing materials defining a conduit therebetween for the passage of a fluid to be heated by absorption of solar radiation, at least one of said light polarizing materials being moveable with respect to the other whereby the axis of absorption of the spaced apart polarizing materials can be placed in varying positions with respect to each other to effect the amount of solar radiation transmitted through the structure whereby the amount of solar energy absorbed by fluid between the polarizing materials is controlled.

2. The solar energy to thermal energy converter of claim 1 wherein at least one of the light polarizing materials is capable of being rotated whereby the axis of absorption of the spaced apart polarizing materials can be placed in varying positions with respect to each other to affect the amount of light transmitted through the structure.

3. The solar energy to thermal energy converter of claim 2 wherein the light polarizing materials are circular in shape.

4. The solar energy to thermal energy converter of claim 1 wherein each of said polarizing materials is quadrangular in shape and comprises a plurality of adjacent strips of materials which are light polarizing, the axis of absorption of each adjacent strip being oriented at a different angle than the next preceeding strip.

5. The solar energy thermal converter of claim 4 wherein the axis of adsorption of each adjacent strip is oriented at substantially right angles to the next preceeding strip.

6. The solar energy thermal converter of claim 5 wherein at least one of the spaced apart polarizing materials is capable of being laterally moved whereby the axis of absorption of the spaced apart polarizing materials can be placed in varying positions with respect to each other to affect the amount of light transmitted through the structure.

7. A solar energy to thermal energy converter comprising at least two spaced apart polarizing materials defining a conduit therebetween for the passage of a fluid to be heated, said polarized materials capable of being positioned with respect to each other whereby the plane of polarization of each of the polarizing materials in one position are crossed so that a minimum of light is transmitted through the spaced apart polarizing materials and whereby the plane of polarization of each of the polarizing materials is substantially aligned in a second position so that a maximum amount of light is transmitted through the spaced apart polarizing materials, whereby the amount of solar energy absorbed by a fluid passing between the polarizing sheet materials can be controlled.

8. A solar energy absorber comprising two spaced apart members defining a conduit therebetween for passage of a fluid to be heated, said absorber being adopted to alter the amount of solar energy that is capable of being transmitted through the absorber, said spaced apart members being formed from a light polarizing material whereby the plane of polarization of each member is capable of being positioned with respect to the other whereby the amount of solar energy that is capable of being transmitted through the members is a maximum amount when the plane of polarization of the members are substantially aligned and the amount of solar energy that is capable of being transmitted through the members is a minimum when the plane of polarization of said members are substantially crossed.

9. A flat plate solar to thermal energy converter comprising a generally rectangular frame having upwardly extending side walls and end walls and a bottom surface;
  a light transparent cover plate;
  two spaced apart light polarizing materials included within said rectangular frame defining a conduit therebetween for the passage of a fluid to be heated by absorption of solar radiation, the axis of absorption of the light polarizing materials being in a fixed predetermined position with respect to each other whereby a minimum amount of solar radiation is transmitted through the polarizing materials thereby maximizing the amount of solar radiation that is available for absorption by a fluid passing between the polarizing materials.

10. In a tubular collector of the type including two concentric tubes for defining a conduit therebetween for the passage of a fluid to be heated by absorption of solar radiation, the improvement comprising:
  said concentric tubes being formed of light polarizing materials and having their axis of absorption substantially crossed whereby a minimum amount of solar radiation is transmitted through the polarizing materials thereby maximizing the amount of solar radiation that is available for absorption by a fluid passing between the polarizing materials.

* * * * *